United States Patent
Wozniczka et al.

(10) Patent No.: US 7,914,943 B2
(45) Date of Patent: Mar. 29, 2011

(54) INTEGRATED SEAL FOR FUEL CELL ASSEMBLY AND FUEL CELL STACK

(75) Inventors: Boguslaw Wozniczka, Coquitlam (CA); Jake de Vaal, Coquitlam (CA); Alfred Wong, Vancouver (CA)

(73) Assignees: Daimler AG, Stuttgart (DE); Ford Motor Company, Dearborn, MI (US)

(*) Notice: Subject to any disclaimer, the term of this patent is extended or adjusted under 35 U.S.C. 154(b) by 604 days.

(21) Appl. No.: 11/207,578

(22) Filed: Aug. 19, 2005

(65) Prior Publication Data
US 2007/0042254 A1  Feb. 22, 2007

(51) Int. Cl.
*H01M 2/14* (2006.01)
*H01M 8/10* (2006.01)
*H01M 8/04* (2006.01)

(52) U.S. Cl. ........ 429/508; 429/514; 429/509; 429/483; 429/458

(58) Field of Classification Search .................. None
See application file for complete search history.

(56) References Cited

U.S. PATENT DOCUMENTS

| | | | |
|---|---|---|---|
| 5,393,619 A | 2/1995 | Mayer et al. | 429/152 |
| 5,688,610 A | 11/1997 | Spaeh et al. | 429/30 |
| 6,025,212 A * | 2/2000 | VanNortwick et al. | 438/111 |
| 6,080,503 A | 6/2000 | Schmid et al. | 429/35 |
| 6,159,628 A | 12/2000 | Grasso et al. | 429/35 |
| 6,316,139 B1 | 11/2001 | Uchida et al. | 429/36 |
| 6,387,557 B1 | 5/2002 | Krasij et al. | 429/32 |
| 6,399,234 B2 | 6/2002 | Bonk et al. | 429/32 |
| 6,699,613 B2 | 3/2004 | Inoue et al. | 429/35 |
| 6,720,101 B1 | 4/2004 | Dong et al. | |
| 6,783,883 B1 | 8/2004 | Koschany | 429/36 |
| 6,946,210 B2 | 9/2005 | Osenar et al. | 429/32 |
| 2001/0001052 A1 | 5/2001 | Bonk et al. | |
| 2001/0018143 A1* | 8/2001 | Okazaki | 429/32 |
| 2001/0051294 A1 | 12/2001 | Inoue et al. | 429/35 |
| 2002/0022170 A1* | 2/2002 | Franklin et al. | 429/34 |
| 2002/0031698 A1 | 3/2002 | Inoue et al. | |
| 2003/0017377 A1 | 1/2003 | Diez | 429/34 |
| 2003/0145942 A1* | 8/2003 | Andrews et al. | 156/285 |
| 2003/0152819 A1* | 8/2003 | Hatoh et al. | 429/32 |
| 2004/0161655 A1 | 8/2004 | Murphy et al. | 429/36 |
| 2004/0168306 A1 | 9/2004 | Kamiyama et al. | 29/623.3 |
| 2005/0064273 A1 | 3/2005 | Bourgeois et al. | 429/38 |
| 2006/0024545 A1 | 2/2006 | Osenar et al. | 429/32 |

FOREIGN PATENT DOCUMENTS

| | | |
|---|---|---|
| EP | 0 933 826 A1 | 8/1999 |
| WO | WO 02/23656 A1 | 3/2002 |
| WO | WO 2004/107476 A2 | 12/2004 |

* cited by examiner

*Primary Examiner* — Dah-Wei D Yuan
*Assistant Examiner* — Maria J Laios
(74) *Attorney, Agent, or Firm* — Patent Central LLC; Stephan A. Pendorf

(57) ABSTRACT

A solid polymer fuel cell comprising a membrane electrode assembly that is in adhesive contact with a first flow field plate around the circumferential edge of the membrane electrode assembly and in non-adhesive contact with a second flow field plate, and an elastomeric manifold seal member that circumscribes at least one manifold opening of the first flow field plate and the second flow field plate. In this configuration, the adhesive substantially seals a first reactant gas while the manifold seal member substantially seals a second reactant gas, thereby improving sealing reliability and simplifying the seal design without overly compressing and damaging the circumferential edge of the membrane electrode assembly.

18 Claims, 7 Drawing Sheets

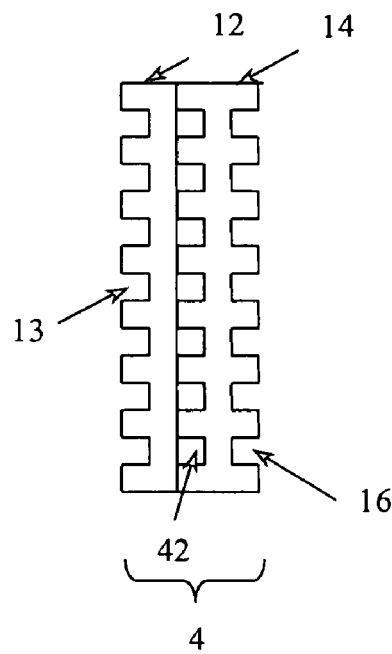
Fig. 7a
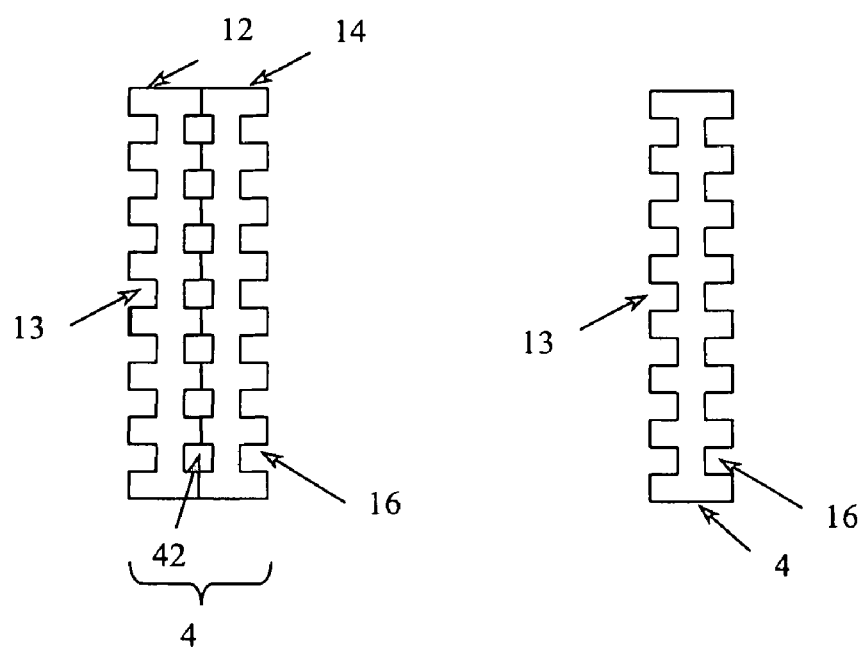
Fig. 7b                    Fig. 7c

INTEGRATED SEAL FOR FUEL CELL ASSEMBLY AND FUEL CELL STACK

BACKGROUND OF THE INVENTION

1. Field of the Invention

The present invention generally relates to a solid polymer electrolyte membrane fuel cell assembly and a fuel cell stack configuration and, more particularly, to an integrated seal for the same.

2. Description of the Related Art

Electrochemical fuel cells convert fuel and oxidant into electricity. Solid polymer electrochemical fuel cells generally employ a membrane electrode assembly (hereinafter referred to as the "MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled for conducting electrons between the electrodes through an external circuit. Typically, a number of MEAs are electrically coupled in series and/or in parallel to form a fuel cell stack having a desired power output.

The MEA is typically interposed between two electrically conductive bipolar flow field plates or separator plates wherein the bipolar flow field plates may comprise polymeric, carbonaceous, graphitic, or metallic materials. These bipolar flow field plates act as current collectors, provide support for the electrodes, and provide passages for the reactants and products. Such bipolar flow field plates may comprise flow fields to direct the flow of the fuel and oxidant reactant gases to the anode and cathode electrodes of the MEA, respectively, and to remove excess reactant gases and reaction products, such as water formed during fuel cell operation.

Fuel cells need to be sealed in order to isolate the anode and cathode electrodes and to prevent leakage of the reactant gas and product streams either internally inside the fuel cell or externally into the environment. The fuel cell stack typically comprises supply or inlet manifolds for directing the flow of reactant gas streams into the fuel cell stack, as well as exhaust or outlet manifolds for directing the flow of product and excess reactant streams out of the fuel cell stack. Alternatively, the fuel cell stack may comprise coolant inlet and outlet manifolds wherein the coolant is circulated to absorb heat from the exothermic reactions of the fuel cell during operation to maintain the fuel cell stack at a desired operating temperature. These manifolds can be internal manifolds wherein the manifold openings are formed in an extended area of the bipolar flow field plate, or can be external manifolds wherein the manifolds are attached to the edge of the bipolar flow field plate. In a fuel cell stack, the manifold openings of each bipolar flow field plate are in fluid communication with corresponding manifold openings of adjacent bipolar flow field plates to form manifolds thereof for the various fluid streams.

To increase power density of the fuel cell stack, there is a consistent trend to decrease fuel cell stack volume by decreasing the thickness of individual fuel cell components. As the thickness of individual fuel cell components decreases to the micron range, thickness tolerances of individual fuel cell components tend to increase due to manufacturing variability of thin components. Furthermore, when the fuel cell components are assembled to form a fuel cell, the thickness tolerance will increase. Thus, seal design is becoming of greater importance because the seals must be able to withstand a wide range of compression pressure to compensate for the large thickness tolerance of the fuel cell.

MEAs may be individually edge-sealed by sealing around the perimeter of the MEA prior to fuel cell stack assembly. One method is to attach a sheet-type gasket frame around a perimeter of the MEA. Elastomeric seals are formed on the bipolar flow field plates and compressed against the gasket frame under a compression pressure, thus providing a substantially fluid leak-tight seal and thereby isolating the reactant gases and product streams and their corresponding inlet and outlet manifolds. However, this sealing method is not cost-effective because it requires a number of materials to form a substantially fluid leak-tight seal. Moreover, variations in MEA thickness around the perimeter of the MEA may result in non-uniform pressure exertion by the reaction force produced by the elastomeric gaskets, and therefore non-uniform sealing may occur around the perimeter of the MEA.

Another method of edge-sealing MEAs is disclosed in U.S. Pat. No. 6,699,613. A liquid sealant is directly in contact with the projecting portion provided at the periphery of the solid polymer electrolyte membrane, is pressed between the solid polymer electrolyte membrane and the separators, fitting the varying sizes of the seal sections, and maintains gas-tightness between the solid polymer electrolyte membrane and the separators (hereinafter referred to interchangeably with "flow field plates"). However, this approach is problematic because the MEA is adhesively attached to both separators and cannot easily be removed from them without damaging the MEA and/or the separators. Thus, if an MEA is degraded and needs to be replaced, the separators will also need to be replaced, thereby increasing replacement costs.

A similar approach is described in U.S. Pat. App. No. 2004/0168306, which discloses a method of laminating a separator and a membrane/electrode assembly for fuel cells and an apparatus for laminating the same. This method corrects a warp in a separator applied with a sealant during production of fuel cells. The correction is performed at a correcting device. With the warp being corrected at the correcting device, a membrane/electrode assembly is superimposed on the separator. Since the membrane/electrode assembly is superimposed on the separator while the separator is corrected with the correcting device being operated, the sealant applied to the separator can be spread out to an even thickness, providing good sealing. However, this method also results in an MEA that is glued to both plates and, thus, entire fuel cell assemblies would need to be replaced when replacing degraded MEAs.

MEAs can also be individually edge-sealed with silicone-based elastomers that are injection-molded to encapsulate and/or impregnate the perimeter of the electrochemically active area of the MEA. However, silicone-based elastomers have been shown to degrade under certain fuel cell operating conditions and exhibit creep and compression set under prolonged stack compression, which can lead to seal thinning with extended fuel cell operation as well as internal and external leakage of the reactant gas and/or coolant. Furthermore, the polymer electrolyte membrane at the perimeter edge of the MEA may experience membrane thinning, thereby increasing the occurrence of premature membrane failures.

U.S. Pat. App. No. 2004/0161655 discloses a method for assembling electrochemical cells for monopolar arrays or bipolar stacks using an adhesive to bond and seal the interfaces of the stack components. Accordingly, no gaskets, o-rings or similar devices are required to seal between the components. However, this method is also undesirable because it would be difficult and expensive to replace individual fuel cell assembly components that have degraded because all the fuel cell assemblies and components are adhesively attached together in the fuel cell stack.

Given these problems, there remains a need to improve the sealing design of fuel cells to improve durability, and to decrease cost and complexity. The present invention addresses these issues and provides further related advantages.

BRIEF SUMMARY OF THE INVENTION

In brief, a solid polymer electrolyte membrane fuel cell assembly and fuel cell stack configuration and, more particularly, a sealing design for the same are disclosed.

In one embodiment, an extended region around a perimeter of an MEA is adhesively attached to a first planar surface of a first flow field plate and not adhesively attached to a second planar surface of a second flow field plate to form a unitized fuel cell. In this configuration, a first electrode of the MEA faces the first surface of the first flow field plate and a second electrode of the MEA faces the second surface of the second flow field plate. The second surface of the second flow field plate comprises an adhesive joint recess that provides a space for the adhesive joint resulting from the adhesive bond of the extended region of the MEA to the first surface of the first flow field plate.

At least one manifold seal member is provided around the perimeter of at least one manifold opening wherein the manifold seal member is situated between the first surface of the first flow field plate and the second surface of the second flow field plate. The first surface of the first flow field plate allows the flow of a first fluid stream and the second surface of the second flow field plate allows the flow of a second fluid stream. In a fuel cell, the first and second fluid streams may comprise gaseous reactants, such as hydrogen and air, as well as any reaction products and inert gases, such as water, steam, and nitrogen.

Alternatively, at least one of the first surface of the first flow field plate and the second surface of the second flow field plate further comprises a manifold seal groove such that the manifold seal member is substantially aligned therein. In this configuration, the adhesive bond prevents external leaks of a first fluid stream as well as intermixing of the first fluid stream with a second fluid stream because the adhesive bond substantially isolates the first fluid stream. Likewise, the manifold seal member prevents intermixing of the second fluid stream and the first fluid stream. Furthermore, the manifold seal member can prevent intermixing of a coolant stream with the first and second fluid streams, if the coolant stream is present in the fuel cell stack. One of ordinary skill in the art will recognize that the adhesive joint does not need to be fully compressed against the surface of the adhesive joint recess of the second bipolar flow field plate because the manifold seal member prevents the second fluid stream from intermixing with the first fluid stream and coolant stream. Moreover, a small gap is allowed between the adhesive joint and the adhesive joint recess if the gap is sufficiently small and if the pressure drop in the oxidant gas stream is small.

In a second embodiment, the adhesive joint recess comprises ridges to provide a small contact pressure between the adhesive joint and the adhesive joint recess, to provide support for the glue joint and to prevent separation of the adhesive joint from the first surface of the first flow field plate under a fuel cell stack compression pressure during operation.

In a third embodiment, the second electrode and the membrane may have a larger surface area than the first electrode to form an extended region around the perimeter of the first electrode. The adhesive material may be applied on the membrane in the extended region to adhesively attach the membrane to the first surface of the first flow field plate while the second electrode of the MEA faces and contacts the second surface of the second flow field plate. In this case, the surface of the second electrode is flush with the second surface of the second flow field plate in the extended region around the perimeter of the MEA because the thickness of the adhesive joint is the same as the thickness of the MEA and thus no adhesive joint recess is necessary on the second surface of the second flow field plate. Alternatively, the MEA is flush-cut (in other words, the edges of the electrodes and the membrane are substantially aligned) and the adhesive infiltrates the circumferential edge of the first electrode to adhesively bond the MEA to the first surface of the first flow field plate.

In still another embodiment, multiple units of such fuel cells can be stacked together to form a fuel cell stack. For example, a first and a second fuel cell may be stacked together such that the second surface of the first flow field plate of the first fuel cell contacts the first surface of the second flow field plate of the second fuel cell to form a fuel cell stack. In this case, the first flow field plate of the first fuel cell and the second flow field plate of the second fuel cell are adhesively joined together to form a bipolar flow field plate. The adhesive seal, the manifold seal member and the flow field plate perimeter seal member in each fuel cell isolate each of the manifold openings, fluids, and MEA wherein the seal members are substantially aligned in their respective seal grooves. The inlet and outlet manifold openings for the first fluid stream, the second fluid stream, and the coolant stream are formed on an extended area of the bipolar flow field plates. Each fuel cell may also comprise a flow field plate seal member and a flow field plate seal groove that is formed on at least one of the first surface of the first flow field plate and the second surface of the second flow field plate wherein the flow field plate perimeter seal member and the flow field plate perimeter seal groove circumscribe the MEA. Alternatively, the manifold seal member may be attached to the flow field plate perimeter seal member to form an integrated seal member and, likewise, the manifold seal groove may be connected with the flow field plate perimeter seal groove wherein the integrated seal member is substantially aligned therein.

In yet another alternative for a fuel cell stack configuration, the second fluid stream can be sealed globally when the fuel cell stack is placed in a stack enclosure that is substantially fluid leak-tight. Internal inlet and outlet manifolds and manifold openings for the second fluid stream are not necessary because the second fluid stream is allowed to flow and vent to those areas defined by the substantially fluid leak-tight stack enclosure. Reactant gas shorting of the second fluid into individual cells can be minimized if the gap between the adhesive joint and the adhesive joint recess is small. Minor external leaks of the first fluid stream may vent into the second fluid stream as long as the leaks have an insignificant effect on fuel cell performance. In addition, the substantially fluid leak-tight stack enclosure can provide a flat surface that may be used to align the individual fuel cells inside the fluid leak-tight stack enclosure during fuel cell stack assembly. In addition, the fluid leak-tight stack enclosure may be configurable to compress the fuel cell stack.

These and other aspects of the invention will be evident upon review of the attached figures an following detailed discussion.

BRIEF DESCRIPTION OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

FIG. 7a shows a cross-sectional view of the bipolar flow field plate wherein the coolant flow fields are on the backside of one of the anode or cathode flow field plates.

FIG. 7b shows a cross-sectional view of the bipolar flow field plate wherein the coolant flow fields are on both the backside of the anode and the cathode flow field plates.

FIG. 7c shows a cross-sectional view of the bipolar flow field plate that comprises one plate with anode and cathode flow fields on each side of the bipolar flow field plate.

DETAILED DESCRIPTION OF THE INVENTION

Unless the context requires otherwise, throughout the specification and claims which follow, the word "comprise" and variations thereof, such as "comprises" and "comprising" are to be construed in an open, inclusive sense, that is as "including but not limited to". Further, while generally disclosed in the context of solid polymer electrolyte (SPE) fuel cell stacks, those of ordinary skill in the art will appreciate that the present invention may be employed with other types of fuel cell stacks as well.

Figure 1:
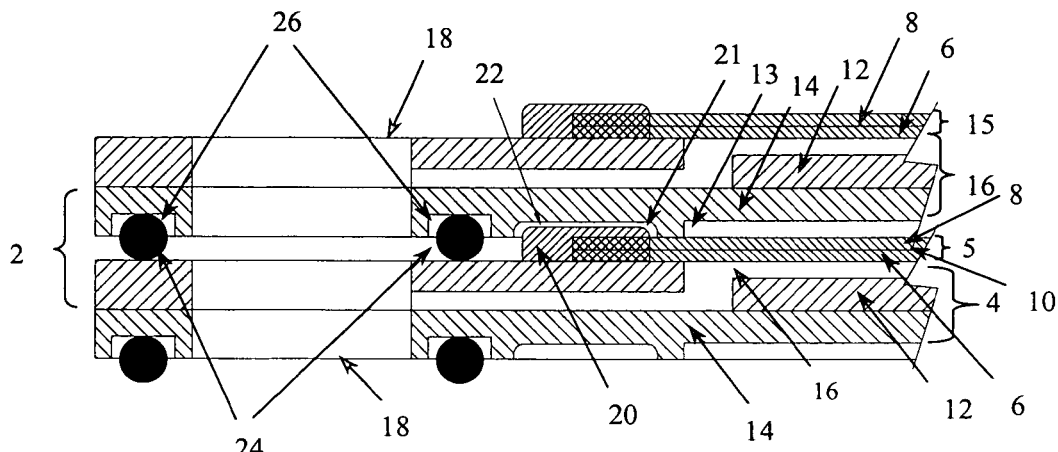
FIG. 1 shows a cross-sectional view of the fuel cell stack according to one illustrated embodiment.
Figure 2:
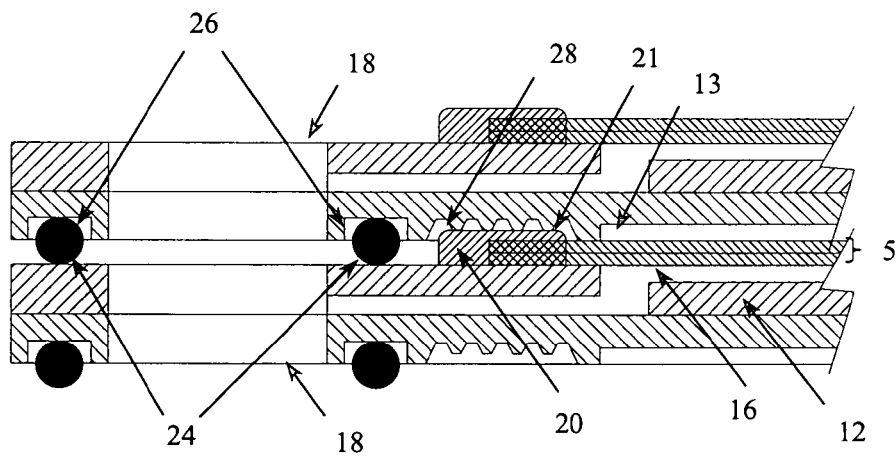
FIG. 2 shows a cross-sectional view of the fuel cell stack according to a second illustrated embodiment.
Figure 3:
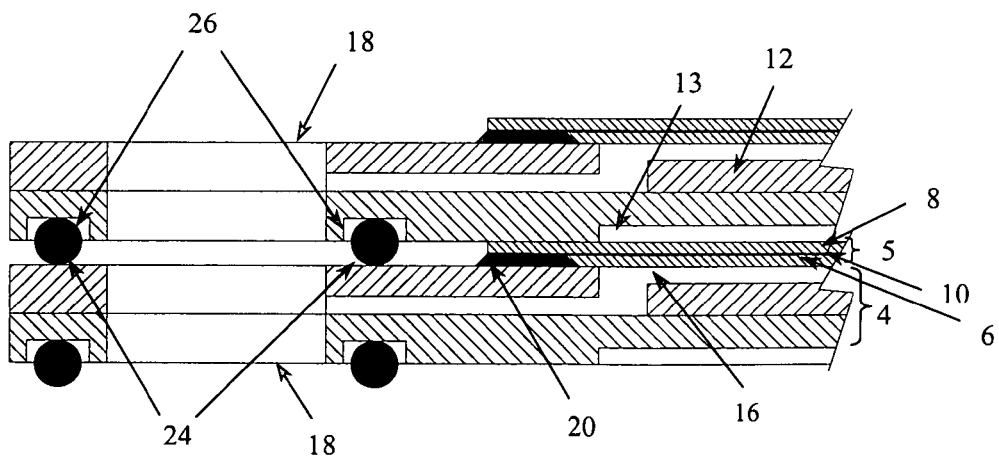
FIG. 3 shows a cross-sectional view of the fuel cell stack according to a third illustrated embodiment.

In FIGS. 1 through 3 discussed in further detail below, it should be understood that the MEA is depicted as being adhesively attached to the fuel flow field surface of the first flow field plate such that the anode electrode of the MEA faces the fuel flow field surface of the first flow field plate, and the oxidant flow field surface of the second flow field plate is in non-adhesive contact with the cathode electrode of the MEA. Alternatively, the MEA may also be adhesively attached to the oxidant flow field surface of the second flow field plate such that the cathode electrode of the MEA faces the oxidant flow field surface of the second flow field plate, and the fuel flow field surface of the first fuel cell plate is in non-adhesive contact with the anode electrode of the MEA. In addition, in FIGS. 1 through 3, coolant flow fields (not shown) are interposed between the flow field plates of adjacent fuel cells. Furthermore, the fuel cell stacks of FIGS. 1 through 3 may comprise of current collector plates placed at each end of the fuel cell stack.

FIG. 1 shows a fuel cell stack according to an embodiment of the present invention. Fuel cell assembly 2 comprises oxidant flow field plate 14 of bipolar flow field plate 16, MEA 5, and fuel flow field plate 12 of bipolar flow field plate 4, wherein MEA 5 comprises anode electrode 6, cathode electrode 8, and membrane 10. In this embodiment, bipolar flow field plate 4 comprises fuel flow field plate 12 and oxidant flow field plate 14. During operation, a fuel gas stream enters fuel flow field 16 through internal manifold 18 and exits through a corresponding internal manifold for fuel gas stream exhaust (not shown). In this case, the fuel stream enters flow field 16 by flowing underneath adhesive joint 20 wherein adhesive joint 20 enables the peripheral region of MEA 5 to be adhesively attached to fuel flow field plate 12 of first bipolar flow field plate 4. Adhesive joint recess 21 on oxidant flow field plate 14 of bipolar flow field plate 16 comprises a space to accommodate adhesive joint 20 of MEA 5. Manifold seal member 24 is situated in manifold seal groove 26 and comprises an elastomeric material that circumscribes fuel manifold opening 18. Under a fuel cell stack compression pressure, manifold seal member 24 provides a substantially fluid leak-tight seal so that each of the reactant and/or coolant streams is substantially isolated. Optionally, gap 22 is allowable to provide compliance for minor creep and compression set of manifold seal member, provided that gap 22 is sufficiently small and does not allow for pressurized gases to blow out manifold seal 24.

A fuel cell stack is formed by stacking a plurality of fuel cell assemblies 2 such that fuel flow field plate 12 of bipolar flow field plate 16 contacts oxidant flow field plate 14 of bipolar flow field plate 16. MEA 15 is adhesively attached to fuel flow field plate 12 of bipolar flow field plate 16 such that anode electrode 6 of MEA 15 faces fuel flow field plate 12 in the same manner as MEA 11 is adhesively attached to fuel flow field plate 12 of bipolar flow field plate 4. An additional oxidant flow field plate (not shown) is placed against cathode electrode 8 of MEA 15 to form a fuel cell stack. The manifold openings of each fuel cell are in fluid communication with the respective manifold openings of adjacent fuel cells to form manifolds for supplying and exhausting the reactant and/or coolant streams. For example, the fuel inlet manifold opening of a first fuel cell is fluidly connected to the fuel inlet manifold opening of a second fuel cell to form a fuel inlet manifold for supplying fuel to the first and second fuel cells.

FIG. 2 shows a fuel cell stack according to another embodiment of the present invention incorporating ridges 28 located in adhesive joint recess 21. Ridges 28 provide mechanical support between adhesive joint 20 and adhesive joint recess 21 to help minimize separation of adhesive joint 20 from fuel flow field plate 12 of bipolar flow field plate 4 when the fuel cell stack is subjected to a compression pressure.

FIG. 3 shows a fuel cell stack according to a further embodiment where adhesive joint 20 is thinner than the MEA. In one alternative, MEA 5 is flush-cut (i.e., edges of the MEA are substantially aligned) and the adhesive infiltrates anode electrode 6, which is porous, and adhesively attaches anode electrode 6 and membrane 10 of MEA 5 to anode flow field plate 12 of bipolar flow field plate 4. In another alternative, membrane 10 and cathode electrode 8 are larger and jut out beyond anode electrode 6 to form an extended region around the circumference of MEA 5. The adhesive is applied to the extended region on membrane 5 of MEA 5 to form adhesive joint 20. In this configuration, no adhesive joint recess is necessary on oxidant flow field plate 14 of flow field plate 16 because adhesive joint 20 is thinner than MEA 5. Therefore, cathode electrode 8 of MEA 5 is flush with oxidant flow field plate 14 of flow field plate 16 in the extended region of MEA 5. At least one of cathode electrode 8 and membrane 10 is larger in perimeter than anode electrode 6 in the extended region of MEA 5.

In all the cases above, elastomeric manifold seal 20 provides compliance to variations in MEA thickness. Suitable manifold seal member materials include, for example, santoprene, ethylene-propylene-diene terpolymer (also known as EPDM) and other types of liquid elastomers. Although the material for manifold seal member 24 may experience the disadvantages of creep and compression set, the material for manifold seal member 24 does not need to be silicone-based injection-moldable materials as in the prior art because these materials have been shown to cause premature membrane degradation when in contact with the edge of the MEA. However, since an epoxy-based material is used to seal around the peripheral edge of the MEA, premature membrane degradation can be minimized.

The thickness of elastomeric manifold seal 20 may be optimized in order to ensure that the pressure applied to adhesive joint 17 in adhesive joint recess 18 is small to prevent high mechanical stress on bipolar flow field plates 4,16 when manifold seal member 24 is subjected to a compressive force. Adhesive joint 20 may comprise a substantially rigid thermoset material that does not need to exhibit substantial elastic properties. Suitable thermoset materials may be, for example, polyimides, polyesters and epoxies. In some embodiments, epoxies may be employed because they exhibit desired durability, such as high resistance to creep and compression set after prolonged stress and high resistance to chemical attack. Furthermore, epoxy resins do not release volatiles or shrink in volume during curing, and exhibit excellent tensile-shear strength upon curing. Epoxies are also relatively cheap compared to conventional gasket materials and only a small amount is required per fuel cell assembly. On the other hand, elastomeric seal materials, such as silicone-based seal materials, exhibit oxidative degradation at operating temperatures above 70° C., seal thinning due to creep under prolonged stress, and delamination from the MEA as result of excessive shearing stresses under high seal compression load.

As illustrated in FIGS. 1 through 3, bipolar flow field plates are typically used in fuel cell stacks. Bipolar flow field plates generally comprise two opposing active surfaces, one surface that comprises fuel flow fields and an opposing surface that comprises oxidant flow fields. In a series arrangement, the surface of the bipolar flow field plate with fuel flow fields faces the anode electrode of a first MEA while the surface of the bipolar flow field plate with oxidant flow fields faces the cathode electrode of an adjacent second MEA. In one alternative, bipolar flow field plates may comprise two plates, namely the fuel flow field plate and the oxidant flow field plate. The fuel flow field plate and the oxidant flow field plate may each comprise two planar surfaces: an active surface that faces and contacts the reactant gases and the corresponding electrodes, and a non-active surface that faces a non-active surface of the adjoining plate. Each flow field plate typically comprises a plurality of channels that allow the flow of reactant gases separated by landings that contact the electrode of the MEA. In some cases, the fuel flow field plate and the oxidant flow field plate can be attached to each other by an adhesive bond, chemical bond, or mechanical bond to form a single bipolar flow field plate such that the non-active surfaces of the two plates face each other and may be in contact with a coolant fluid.

Figure 4A:
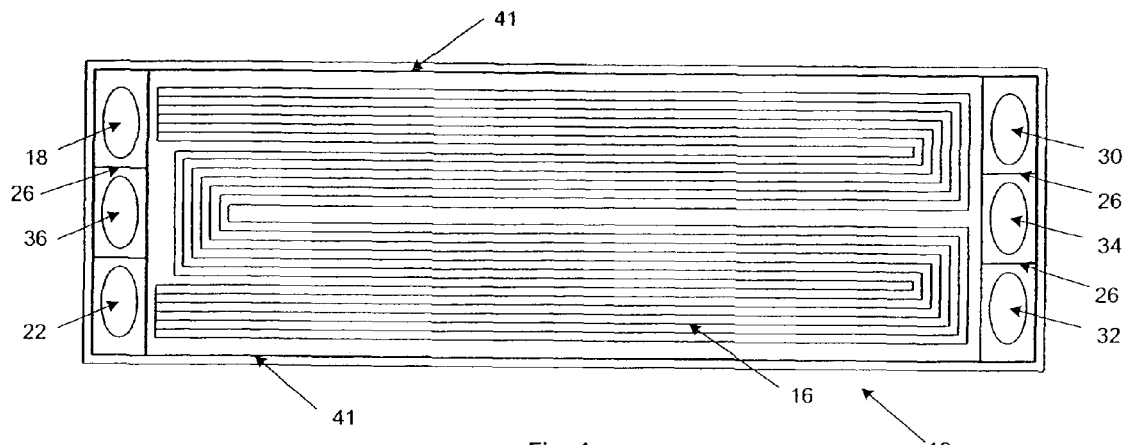
FIG. 4a shows a planar view of the oxidant flow field plate according to one configuration of the fuel cell stack.
Figure 4B:
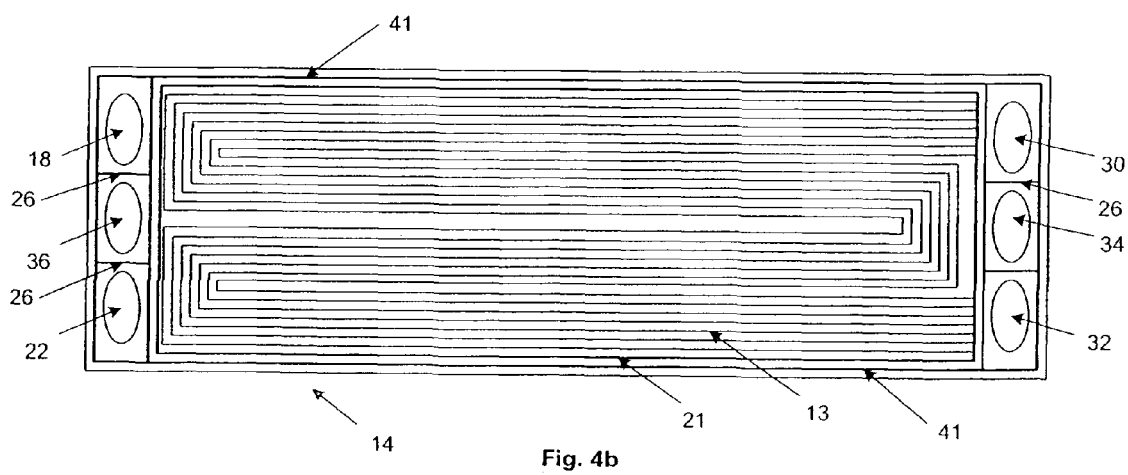
FIG. 4b shows a planar view of the fuel flow field plate according to one configuration of the fuel cell stack.

FIG. 4a shows the active surface of a fuel flow field plate with fuel flow fields 16 that guide the fuel gas stream from fuel inlet manifold opening 18 to fuel outlet manifold opening 22. Fuel flow field plate 12 further comprises oxidant inlet manifold opening 30 and oxidant outlet manifold opening 32 to allow for supply and exhaust of the oxidant gas stream, respectively, as well as coolant inlet manifold opening 34 and coolant outlet manifold opening 36 to allow for supply and exhaust of the coolant stream, respectively. Manifold seal groove 26 provides a space to accommodate manifold seals (not shown) that isolate oxidant inlet manifold opening 30, oxidant outlet manifold opening 32, coolant inlet manifold opening 34 and coolant outlet manifold opening 36 from fuel flow fields 16. Similarly, FIG. 4b shows the active surface of an oxidant flow field plate with oxidant flow fields 13 that guide the oxidant gas stream from oxidant inlet manifold opening 30 to oxidant outlet manifold opening 32. Oxidant flow field plate 14 further comprises fuel inlet manifold opening 18 and fuel outlet manifold opening 22 to allow for supply and exhaust of the fuel gas stream, respectively, as well as coolant inlet manifold opening 34 and coolant outlet manifold opening 36 to allow for supply and exhaust of the coolant stream, respectively. Again, manifold seal groove 26 provides a space to accommodate manifold seals (not shown) that isolate fuel inlet manifold opening 18, fuel outlet manifold opening 22, coolant inlet manifold opening 34 and coolant outlet manifold opening 36 from oxidant flow fields 13.

In both FIGS. 4a and 4b, at least one of fuel flow field plate 12 and oxidant flow field plate 14 may comprise flow field plate seal groove 41 to accommodate a flow field plate seal member (not shown) that prevents leakage of air from the fuel cell. In one alternative, the flow field plate seal member may be connected to the manifold seal member to form an integrate flow field plate seal member thereof and, thus, flow field plate seal groove 41 will be connected to manifold seal groove 26.

Figure 4C:
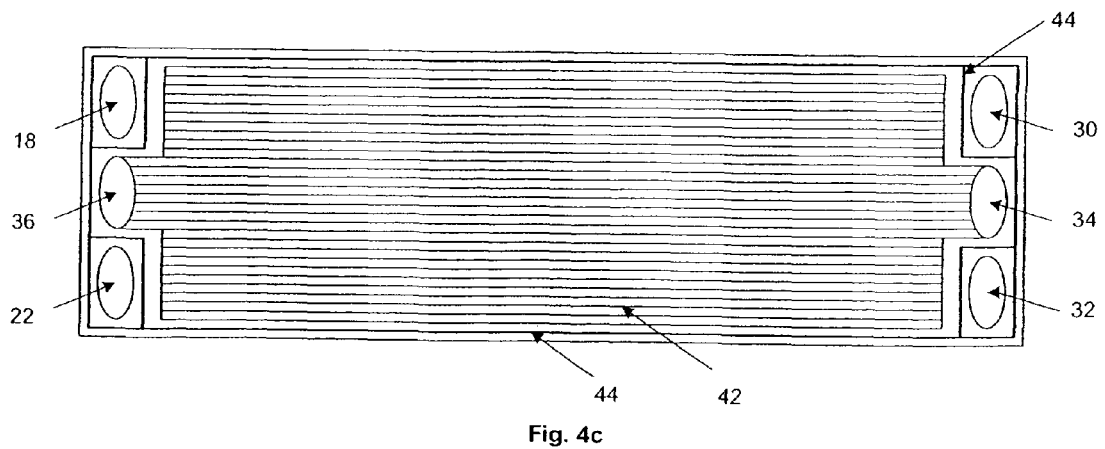
FIG. 4c shows a planar view of the coolant flow field plate according to one configuration of the fuel cell stack.

The non-active surface of either or both the anode and cathode flow field plates may further comprise coolant flow fields, as shown in FIG. 4c, which may also comprise a plurality of landings and channels. Coolant flow fields 42 guide the coolant stream from coolant inlet manifold opening 34 to coolant outlet manifold opening 36. The non-active surface may also comprise adhesive groove 44 to provide a space for disposing an adhesive therein for adhesively joining the fuel flow field plate and the oxidant flow field plate to form a bipolar flow field plate, and for isolating each manifold individually to prevent fluid streams from mixing with each other.

In this configuration, the surface of the bipolar flow field plate with fuel flow fields faces the anode electrode of a first MEA while the surface of the bipolar flow field plate with oxidant flow fields faces the cathode electrode of an adjacent second MEA. Alternatively, the bipolar flow field plate may comprise one plate wherein both opposing surfaces of the bipolar flow field plate are active, for example, one surface comprises fuel flow fields and the opposing surface comprises oxidant flow fields.

Figure 5A:
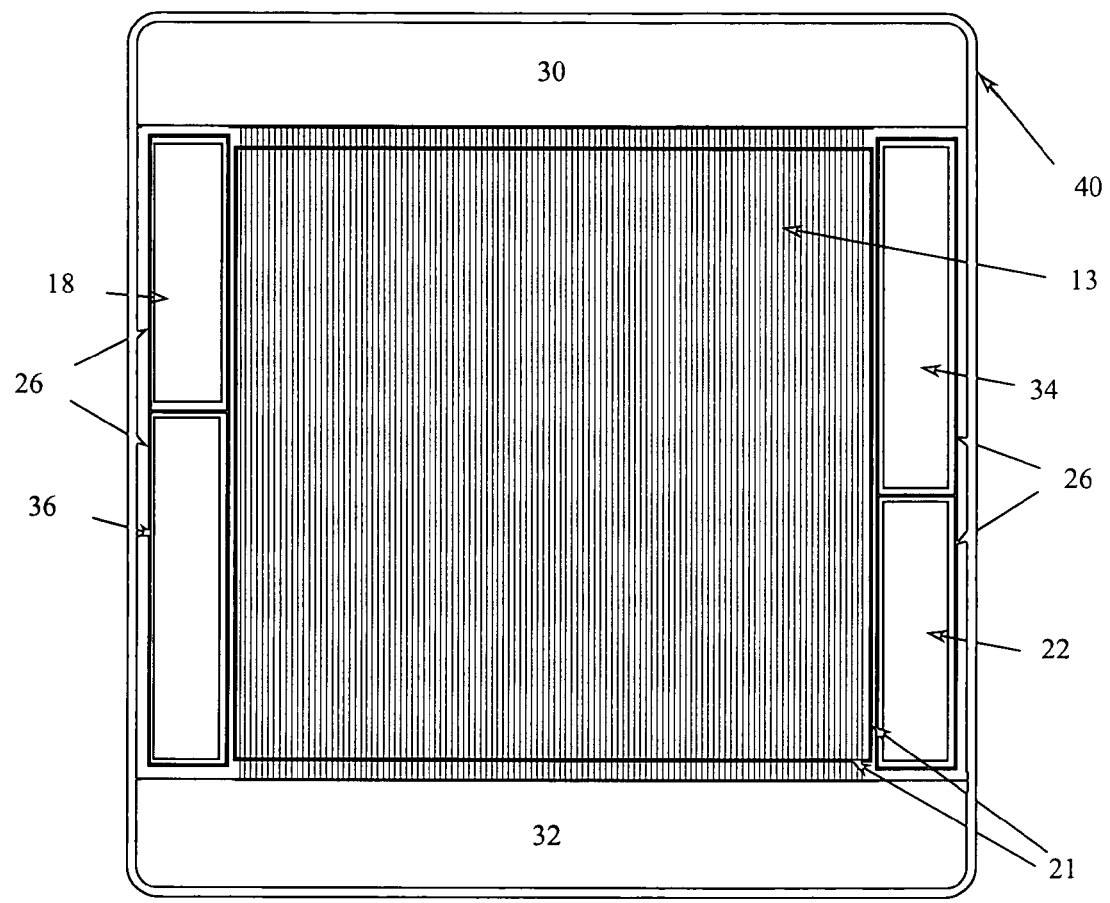
FIG. 5a shows a planar view of the oxidant flow field plate and possible manifold locations in the fluid leak-tight stack enclosure.

FIG. 5a shows a planar view of a possible oxidant flow field plate configuration according to another embodiment of the present invention. Oxidant inlet manifold opening 30 and oxidant outlet manifold opening 32 are formed by fluid leak-tight stack enclosure 40 around the flow field plate wherein the oxidant gas enters and exits the fuel cell stack directly from the manifold defined by fluid leak-tight stack enclosure 40 surrounding the fuel cell stack. Oxidant flow fields 13 deliver oxidant gas from oxidant inlet manifold opening 18 to oxidant outlet manifold opening 22. Manifold seal groove 26 circumscribes fuel gas inlet manifold opening 18 and fuel gas outlet manifold opening 22, as well as coolant inlet manifold opening 34 and coolant outlet manifold opening 36 to provide a space for the manifold seal member. Furthermore, adhesive joint recess 21 circumscribes the electrochemically active area of the oxidant flow field plate to provide a space for the adhesive seal joint of the MEA. In this case, the flow field landings of the oxidant plates comprise an adhesive joint recess to support the adhesive joint. One of ordinary skill in the art will recognize that the depth of the flow field channels on the oxidant plate should be greater than the depth of the adhesive joint recess in order to allow the flow of oxidant gas from oxidant inlet manifold opening 30 to oxidant outlet manifold opening 32.

Figure 5B:
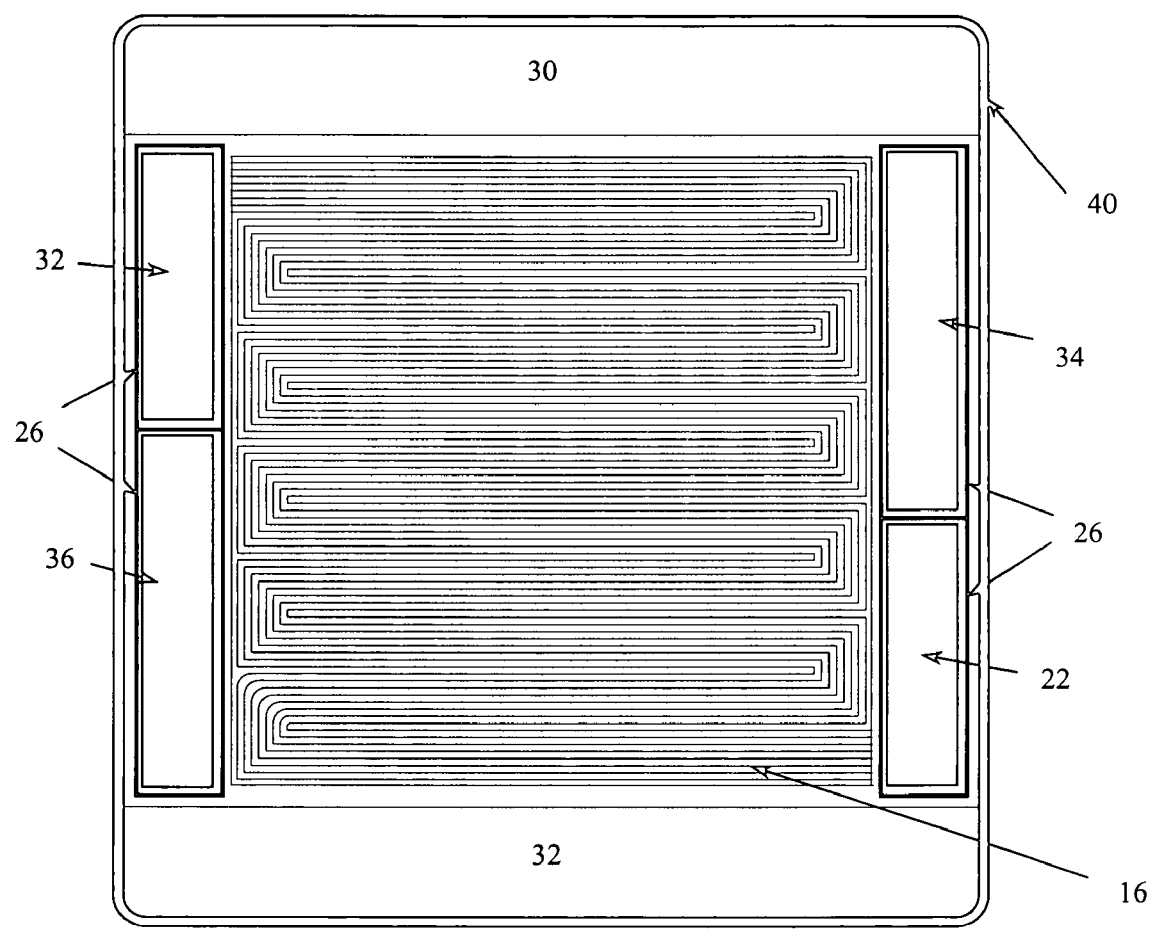
FIG. 5b shows a planar view of the fuel flow field plate and possible manifold locations in the fluid leak-tight stack enclosure.

FIG. 5b shows a schematic of a representative fuel flow field plate configuration in fluid leak-tight stack enclosure 40. Fuel flow fields 16 deliver fuel gas from fuel inlet manifold opening 18 to fuel outlet manifold opening 22. Again, manifold seal groove 26 surround fuel gas inlet manifold opening 18 and fuel gas outlet manifold opening 22, as well as coolant inlet manifold opening 34 and coolant outlet manifold opening 36 to provide a space for the manifold seal member to substantially align therein.

Figure 5C:
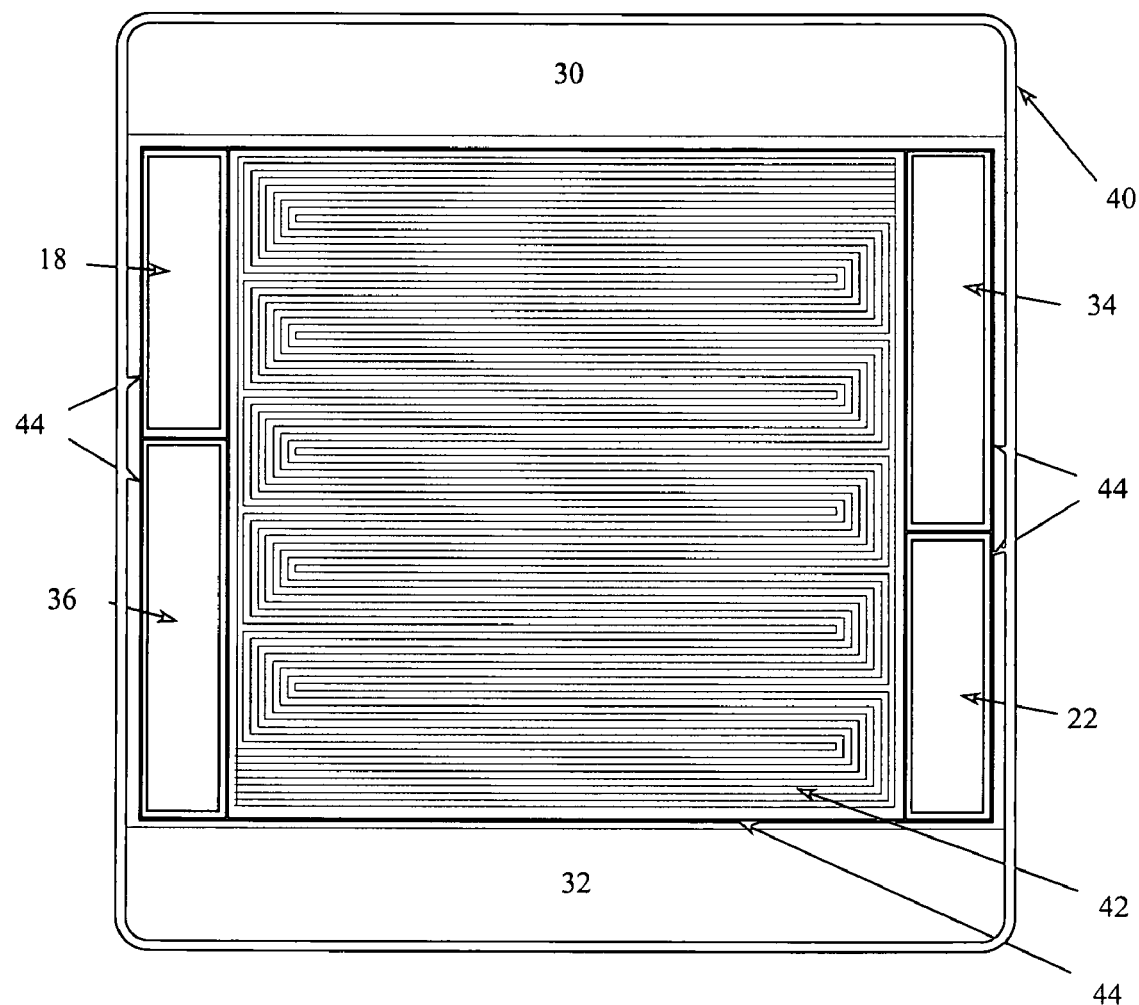
FIG. 5c shows a planar view of the coolant flow field plate and possible manifold locations in the fluid leak-tight stack enclosure.

FIG. 5c shows a schematic of a coolant flow field plate in fluid leak-tight stack enclosure 40. Coolant flow fields 42 deliver coolant from the coolant inlet manifold opening 34 to coolant outlet manifold opening 36. The coolant stream is isolated from the oxidant gas stream and fuel gas stream using a manifold seal member or an adhesive around fuel manifold openings 18, 22, as well as along each edge of coolant flow field plate 38 such that the manifold seal member or adhesive is aligned or disposed in adhesive groove 44 to prevent leakage of the coolant fluid into the fuel and oxidant gas streams.

Figure 6:
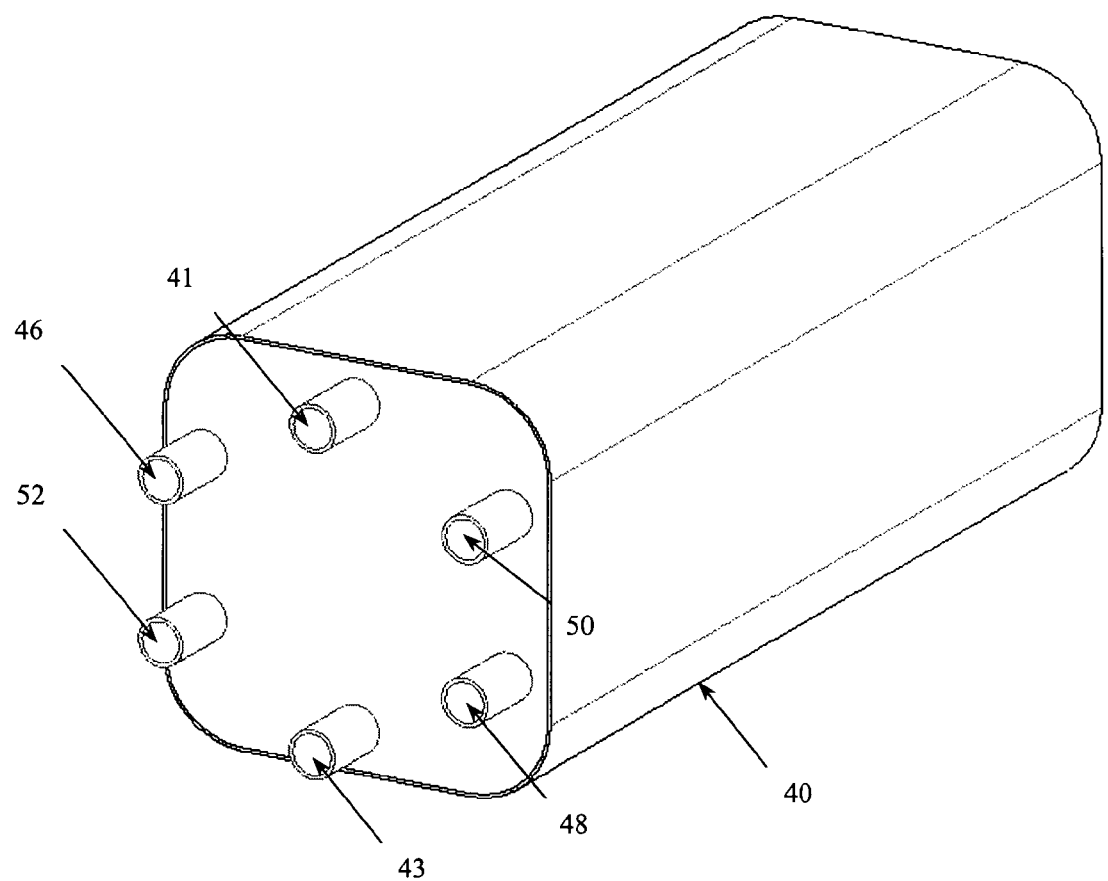
FIG. 6 shows a three-dimensional view of the fluid leak-tight stack enclosure.

FIG. 6 shows a three-dimensional view of a substantially fluid leak-tight stack enclosure. Oxidant inlet port 41, oxidant outlet port 43, fuel inlet port 46, fuel outlet port 48, coolant inlet port 50, and coolant outlet port 52 are formed on one end of stack enclosure 40. Each port is in fluid connection with its corresponding manifold. For example, the fuel inlet manifold opening for each fuel cell is fluidly connected to form a fuel inlet manifold, which is fluidly connected to fuel inlet port 46. In this configuration, fluid leak-tight stack enclosure 40 is a dielectric material to prevent fuel cell stack shorting.

There are many advantages to forming the oxidant manifolds using the walls of the fluid leak-tight stack enclosure. For example, fuel cell stack ventilation of minor fuel and coolant leaks can be accomplished by venting oxidant outlet manifold opening 32 because any minor fuel and coolant leaks will leak into oxidant inlet manifold opening 30 and oxidant outlet manifold opening 32, thus eliminating the need for an extra mechanism or mechanical device to vent the stack enclosure. Optionally, fluid leak-tight stack enclosure 40 is configurable to compress the fuel cell stack, for example with tie rods (not shown) that extend along a length of fluid leak-tight stack enclosure 40 or by welding the edges of stack enclosure 40 thereby eliminating the need of additional compression hardware. In addition, stack enclosure 40 may comprise thermal insulation (not shown) that is placed on at least one of the inner and outer surfaces of stack enclosure 40 to prevent freezing of the fuel cell stack under freezing conditions.

FIGS. 7a, 7b, and 7c illustrate representative bipolar plate configurations. In FIG. 7a, bipolar flow field plate 4 is formed such that second surface of fuel flow field plate 12 is attached to the second surface of oxidant flow field plate 14. In this example, coolant flow fields 42 are formed on the second surface of oxidant flow field plate 14 while the second surface of fuel flow field plate 12 may be flat. Alternatively, coolant flow fields 42 may be formed on the second surface of fuel flow field plate 12 while the second surface of oxidant flow field plate 14 may be flat. In FIG. 7b, bipolar flow field plate 4 is formed such that fuel flow field plate 12 is attached to oxidant flow field plate 7 wherein coolant flow fields 42 are formed on the second surface of both fuel flow field plate 12 and oxidant flow field plate 14. FIG. 7c is a schematic of a bipolar flow field plate such that bipolar flow field plate 4 comprises one plate wherein fuel flow fields 13 are formed on the first surface of bipolar flow field plate 4 and oxidant flow fields 16 are formed on the second surface of bipolar flow field plate 4.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

What is claimed is:

1. A solid polymer fuel cell comprising:
   a membrane electrode assembly comprising an anode, a cathode, and a solid polymer membrane disposed therebetween; and
   a first flow field plate which conveys a fuel flow in contact with said anode and a second flow field plate which conveys an oxidant flow in contact with said cathode, each of the first flow field plate and the second flow field plate having a first major surface and a second major surface, as well as at least one manifold opening; wherein,
   the membrane electrode assembly is adhesively attached to the first major surface of the first flow field plate by an adhesive material that is disposed around the perimeter of the membrane electrode assembly to provide a substantially fluid leak-tight seal, and forms an adhesive joint between said first major surface of the first flow field plate and the membrane electrode assembly;
   the second major surface of the second flow field plate is in non-adhesive contact with the membrane electrode assembly;
   the second major surface of the second flow field plate comprises an adhesive joint recess adapted to receive the adhesive joint without adhesive contact between said adhesive joint and said recess; and
   the adhesive joint recess further comprises at least one ridge adapted to contact the adhesive joint.

2. The solid polymer fuel cell of claim 1, wherein
   the first major surface of the first flow field plate comprises an anode flow field adjacent the anode; and
   the second major surface of the second flow field plate comprises a cathode flow field adjacent the cathode.

3. The solid polymer fuel cell of claim 1, wherein the adhesive is a thermoset material.

4. The solid polymer fuel cell of claim 1, further comprising a manifold seal member wherein the manifold seal member circumscribes the at least one manifold opening.

5. The solid polymer fuel cell of claim 4 wherein at least one of the first major surface of the first flow field plate and the second major surface of the second flow field plate comprise a manifold seal groove adapted to receive the manifold seal member.

6. The solid polymer fuel cell of claim 4 wherein the manifold seal member comprises an elastomeric material.

7. The solid polymer fuel cell of claim 1, further comprising a flow field plate seal member adapted to circumscribe the membrane electrode assembly.

8. The solid polymer fuel cell of claim 7 wherein at least one of the first major surface of the first flow field plate and the second major surface of the second flow field plate comprise a flow field plate seal groove adapted to receive the flow field plate seal member.

9. The solid polymer fuel cell of claim 8 wherein the flow field plate seal member comprises an elastomeric material.

10. The solid polymer fuel cell stack comprising a plurality of solid polymer fuel cells of claim 1.

11. The solid polymer fuel cell stack of claim 10 wherein the fuel cell stack is disposed in a substantially fluid leak-tight enclosure, and wherein an inner surface of the enclosure cooperates with an outer surface of the fuel cell stack to form at least one manifold thereof.

12. The solid polymer fuel cell stack of claim 11 wherein the stack enclosure is a dielectric material.

13. The solid polymer fuel cell stack of claim 11 wherein the stack enclosure is configurable to compress the fuel cell stack.

14. A method of making a solid polymer fuel cell, said method including a step of forming a substantially fluid leak-tight seal around the perimeter of a membrane electrode assembly that comprises an anode, a cathode and a polymer electrode membrane interposed therebetween, said membrane electrode assembly being planar and having first and second major surfaces; said method comprising:
   forming said seal by adhesively attaching the membrane electrode assembly to a first major surface of a first flow field plate around the perimeter by an adhesive material to form an adhesive joint;
   placing the membrane electrode assembly in non-adhesive contact with a second major surface of a second flow field plate; and
   providing the second major surface of the second flow field plate with an adhesive joint recess adapted to receive the adhesive joint without adhesive contact;
   wherein the adhesive joint recess further comprises at least one ridge adapted to contact the adhesive joint.

15. The method of claim 14, wherein:
the first major surface of the membrane electrode assembly is an anode electrode;
the second major surface of the membrane electrode assembly is a cathode electrode;
the first major surface of the first flow field plate comprises anode flow fields, the first flow field plate being a bipolar flow field plate; and
the second major surface of the second flow field plate comprises cathode flow fields, the second flow field plate being a bipolar flow field plate.

16. A method of making an integrated fuel cell stack comprising:
   combining a plurality of fuel cells made by the method of claim 14 to form a fuel cell stack, wherein a first major surface of the second flow field plate is in contact with a first major surface of an adjacent membrane electrode assembly and a substantially fluid leak-tight stack enclosure around the fuel cell stack;
wherein the substantially fluid leak-tight stack enclosure forms at least one manifold opening thereof and is configurable to compress the fuel cell stack.

17. The method of claim 16, wherein:
the first major surface of the second flow field plate comprises anode flow fields;
the second flow field plate is a bipolar flow field plate; and
the first major surface of the adjacent membrane electrode assembly is an anode electrode.

18. A solid polymer fuel cell comprising:
a membrane electrode assembly MEA having first and second electrodes, with a solid polymer membrane disposed therebetween; and
a first flow field plate which conveys a first fluid flow on an active major surface thereof, in contact with said first electrode, and a second flow field plate which conveys a second fluid flow on an active major surface thereof, in contact with said second electrode, each of the first and second flow field plates having at least one manifold opening; wherein,
a peripheral region of said MEA is adhesively attached to said active major surface of said first flow field plate, and is in nonadhesive contact with said active major surface of said second flow field plate;
adhesive attachment of said peripheral region of said MEA to said active major surface of said first flow field plate is provided by an adhesive joint which is formed on a major surface of said second electrode and on said active major surface of said first flow field plate;
nonadhesive contact of said peripheral region of said MEA with said active major surface of said second flow field plate is between a major surface of said second electrode and said active major surface of said second flow field plate; wherein
the first electrode is an anode;
the second electrode is a cathode;
the active major surface of the first flow field plate comprises an anode flow field adjacent the anode;
the active major surface of the second flow field plate comprises a cathode flow field adjacent the cathode;
the active major surface of the second flow field plate comprises an adhesive joint recess adapted to receive the adhesive joint without adhesive contact between said adhesive joint and said recess; and
the adhesive joint recess further comprises at least one ridge adapted to contact the adhesive joint.

* * * * *